Oct. 18, 1949.  G. G. KUBO  2,484,951
RETRACTIBLE WHEELED SUPPORT FOR LUGGAGE
Filed Aug. 7, 1947  4 Sheets-Sheet 1
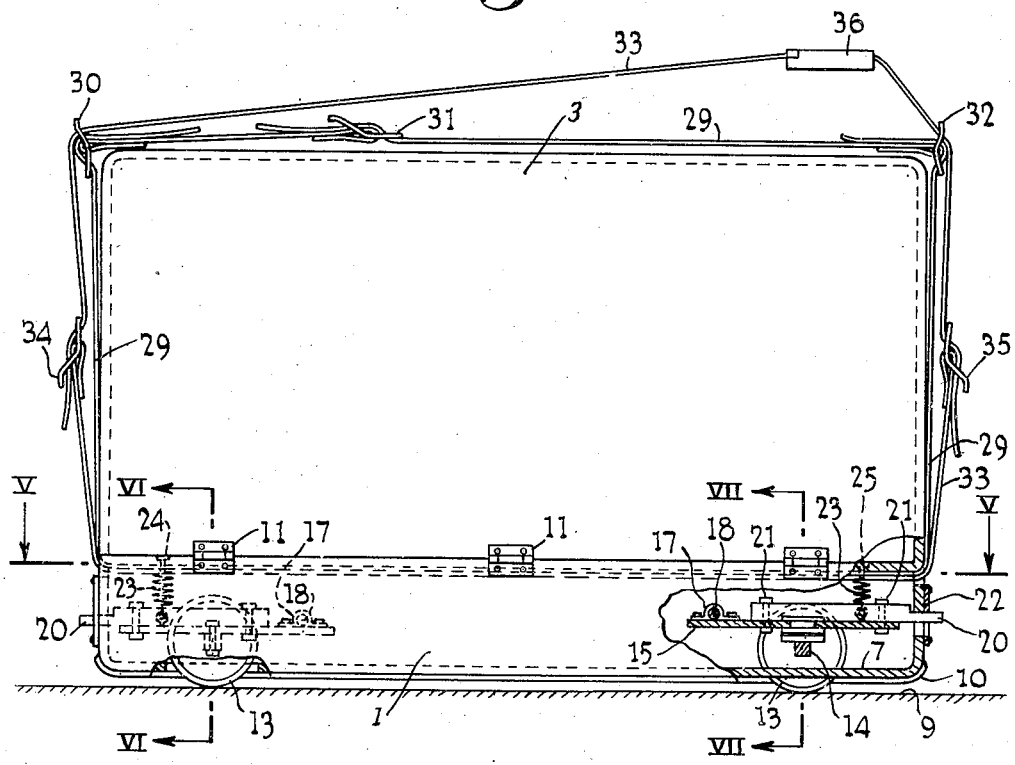
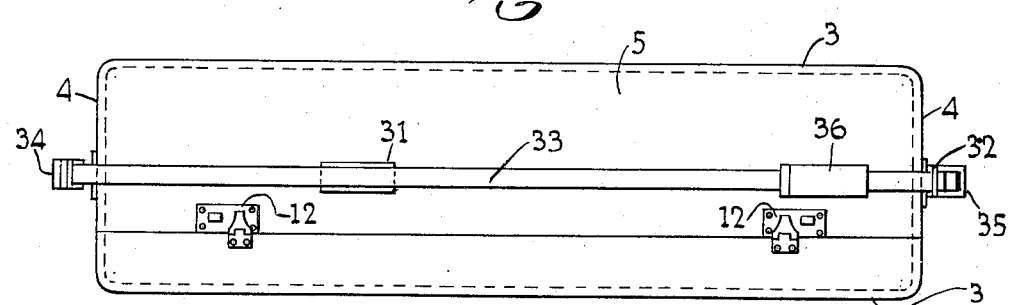
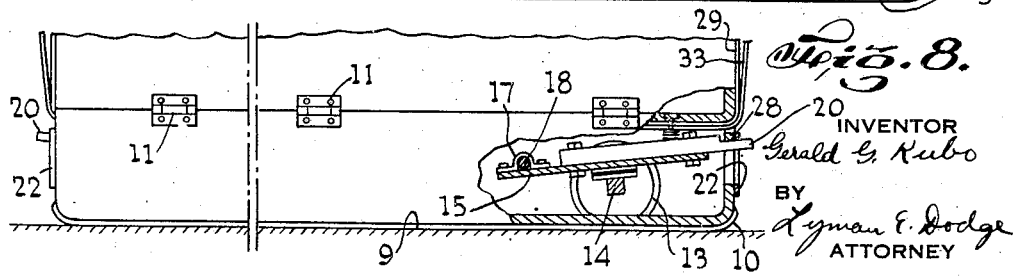
INVENTOR
Gerald G. Kubo
BY
Lyman E. Dodge
ATTORNEY

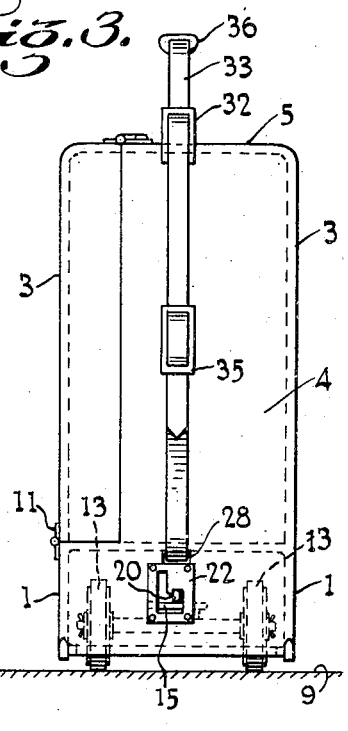
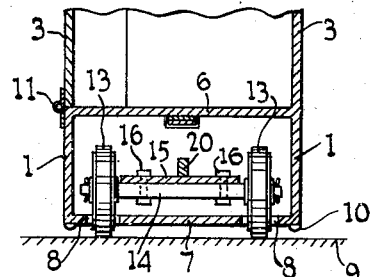
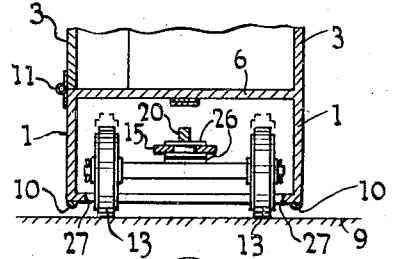
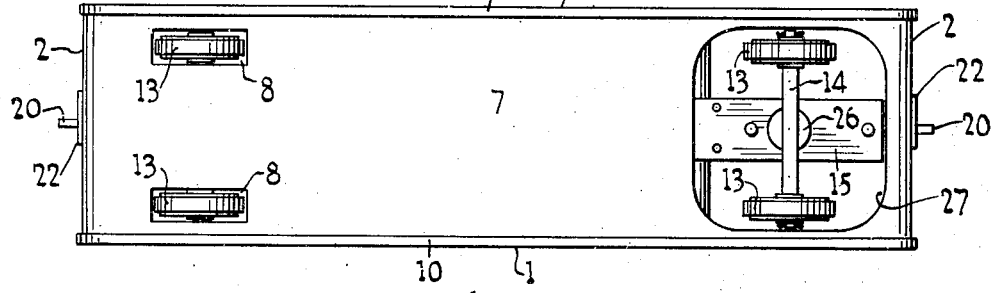
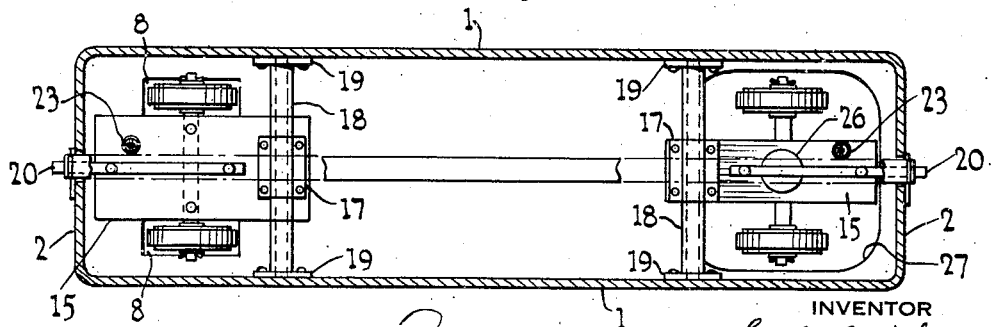

Oct. 18, 1949.   G. G. KUBO   2,484,951
RETRACTIBLE WHEELED SUPPORT FOR LUGGAGE
Filed Aug. 7, 1947   4 Sheets-Sheet 3
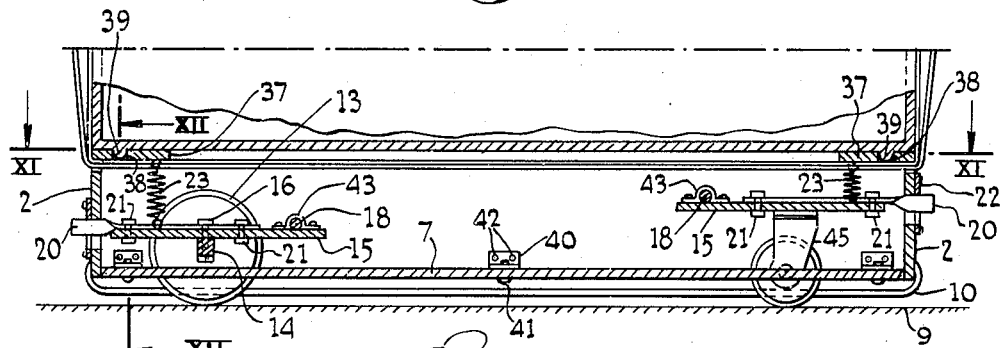
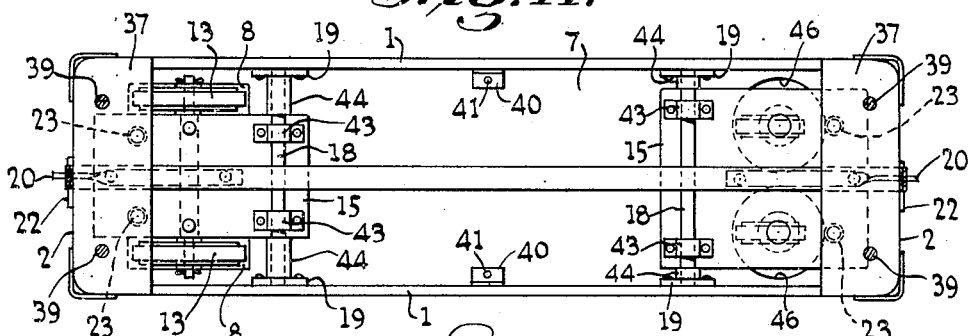
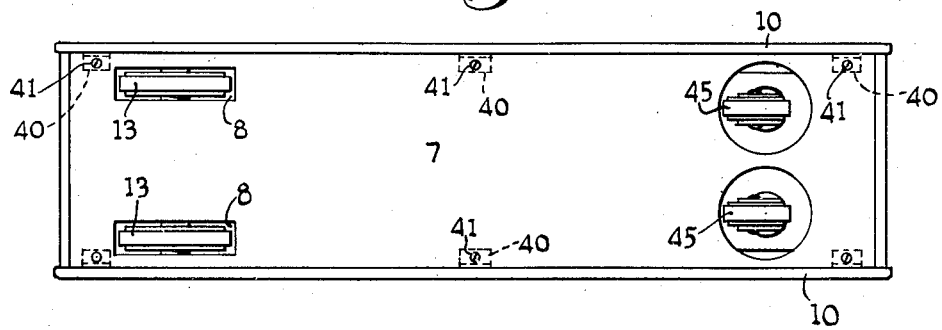
INVENTOR
Gerald G. Kubo
BY
Lyman E. Dodge
ATTORNEY Oct. 18, 1949.    G. G. KUBO    2,484,951
RETRACTIBLE WHEELED SUPPORT FOR LUGGAGE
Filed Aug. 7, 1947    4 Sheets-Sheet 4
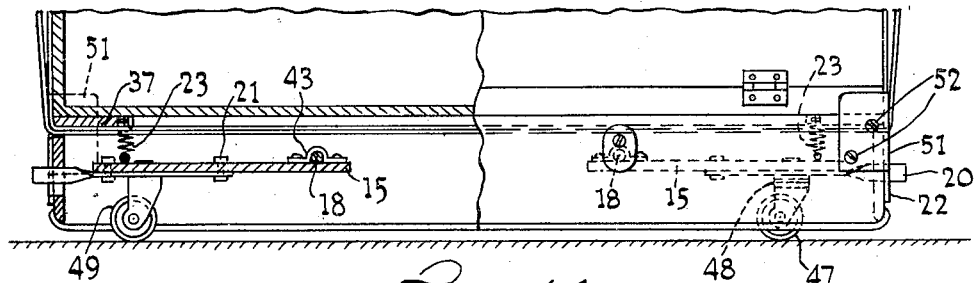
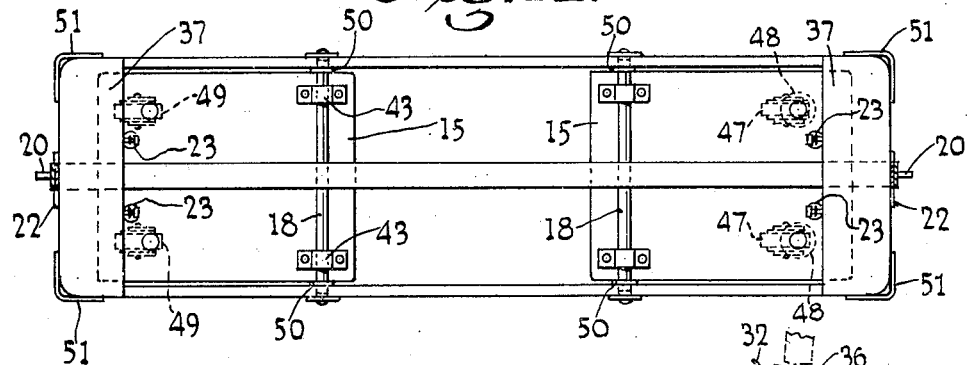
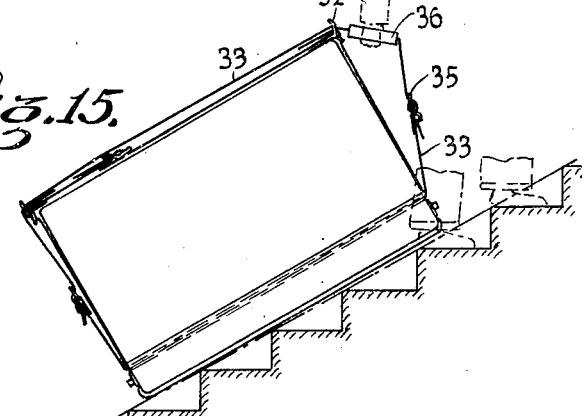
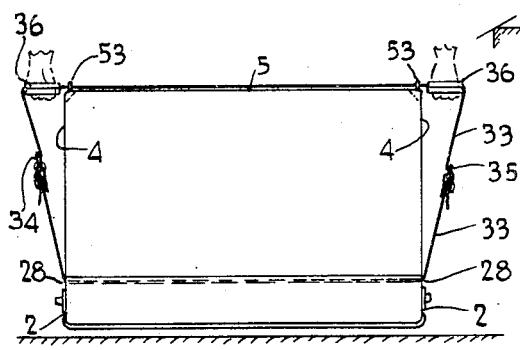
INVENTOR
Gerald G. Kubo
BY
Lyman E. Dodge
ATTORNEY Patented Oct. 18, 1949

2,484,951

UNITED STATES PATENT OFFICE 2,484,951

RETRACTABLE WHEELED SUPPORT FOR LUGGAGE

Gerald G. Kubo, New York, N.Y.

Application August 7, 1947, Serial No. 767,011

6 Claims. (Cl. 280—38)

My invention relates to improvements in luggage carriers, in which means are provided for aiding in supporting and transporting luggage.

The object of the invention is to provide a carrier mechanism and structure which is compact and which can readily be attached to any piece of luggage or built into such luggage, as desired.

The invention consists in the combination of elements and in certain parts of novel construction included therein, in order to obtain the desired result.

A full understanding of my invention is best given by a detailed description of a number of constructions embodying the various features of my invention, and such a description will now be given in connection with the accompanying drawings, showing such preferred constructions. The features forming the invention will then be specifically pointed out in the claims.

In the accompanying drawings:

Figure 1 is a side elevation of my improved built-in luggage carrier, partly in section, supporting a suit case and showing the carrier in position to be moved on supporting wheels; Fig. 2 is a plan view of Fig. 1; Fig. 3 is an end view of the suit case and carrier; Fig. 4 is a bottom view of the carrier; Fig. 5 is a sectional plan view looking in the direction of line V—V of Fig. 1; Fig. 6 is a sectional view taken on the line VI—VI of Fig. 1; Fig. 7 is a sectional view taken on the line VII—VII of Fig 1; Fig. 8 is a side elevation, similar to Fig. 1, and partly in section, showing the carrier wheels retracted, and the carrier in position to be slidably moved on supporting runners; Fig. 9 is a side elevation, partly in section, showing a detachable carrier provided at one end with retractable supporting wheels and at the other end with retractable supporting casters; Fig. 10 is a bottom plan view of the carrier structure of Fig. 9; Fig. 11 is a sectional plan view looking in the direction of line XI—XI of Fig. 9; Fig. 12 is a sectional view looking in the direction of line XII—XII of Fig. 9; Fig. 13 is a side elevation, partly in section, showing a detachable carrier provided at the front end with retractable ball bearing caster wheels and at the rear end with retractable caster wheels secured for longitudinal rolling only; Fig. 14 is a top plan view of the carrier of Fig. 13; Fig. 15 is a side elevation of a luggage carrier and suit case being transported up a set of stairs on its slide runners; and Fig. 16 is a side elevation of a luggage carrier and suit case and an arrangement of handling straps and hand grips permitting two operators to cooperate in handling a heavily loaded luggage carrier.

Similar reference characters designate corresponding parts throughout the several figures of the drawings.

In the embodiments of the invention shown in Figures 1 to 8, inclusive, the luggage carrier according to one form of the invention comprises a conventional suit case, shopper's carry-all, or salesman's sample case and and a built-in carrier and supporting mechanism whose side walls 1, 1 and end walls 2, 2, are extensions or continuations of the side walls 3, 3, and end walls 4, 4, of the suit case whose top wall is shown at 5 and whose bottom wall is shown at 6. In this embodiment, the wall 6 constitutes also the top wall of the carrier structure and the bottom of the said carrier is closed off by the wall 7 having a pair of openings 8, 8, at the rear end and an opening 27 at the front end. The side walls 1, 1, are provided with smooth metal slide runners 10, 10, along the length of the underside thereof and resting on the ground or pavement 9, as shown in Fig. 8.

One of the sides 3 of the suit case is hinged as shown at 11, 11, 11, to form a door permitting access to the interior thereof and which is secured to the top 5 by conventional latches and locks shown at 12, 12.

Each end of the carrier structure is provided with a pair of rubber-tired wheels 13, 13, each pair mounted on an axle 14, which in turn, is mounted on a plate or platform 15. The front axle is allowed to rotate horizontally about a vertical axis located at its center by means of a conventional "fifth wheel" 26 common in wagon structures, which may be of the greased plate or ball bearing type. The rear axle is fixed in position to the platform 15 by means of bolts 16, 16. One end of said platform 15 is pivotally attached by a loose fitting long clamp 17, to a supporting rod or pipe, 18, whose ends are mounted on the side walls 1, 1, respectively, as shown at 19, 19.

A bar, 20, is bolted to the plate 15, as shown at 21, 21, with one end extending through a two-position latch plate, 22, fastened over an opening in the end wall 2. The bar 20 when lowered or raised by the operator's foot to the lower or upper position on the latch plate 22 moves against the pull of a spring, 23, one end of which is bolted to the underside of wall 6 and the other to the platform 15, as shown at 24 and 25, and the bar and its connected mechanism are retained in the desired position.

The above described lowering of the bar 20 to the lower notch in the plate 22, as will be apparent, rotates the platform 15 on the supporting rod 18, causing the lower part of the wheels 13, 13, to pass through the opening 8, 8, and 27, into contact with the ground or pavement 9 and raising the carrier structure a desired distance therefrom. The retracting of the wheels, of course, is accomplished by reversing the above described action, causing the carrier structure side runners to then rest on the ground or pavement. The relatively long pipe sleeves 44, in Fig. 11 serve to limit the transverse shifting of the plate or platform 15 to coincide with that of the bar 20 as it is moved laterally from notch to notch in the plate 22.

The luggage carrier is provided with a handling strap 33 of leather, webbing or the like, which is passed longitudinally through openings 28, 28, in the end walls 2, 2, and thence along the bottom and up along the sides of the walls 4, 4, and thence along the top 5 of the suit case as shown in Fig. 16. The strap is attached to the carrier frame at some convenient point, preferably to the underside of the false bottom 6. The two sections of the handling strap 33 are joined together by conventional friction buckles 34 and 35 by means of which the position of the handling strap can be adjusted to suit the individual user. At both top corners a built-in pivoted strap guide 53 is provided to transfer lateral movements of the strap handle to the suit case.

A removable hand grip 36 which can be clamped to the handle strap 33 at any desired position is provided for comfort and convenience. When the carriage wheels are lowered and the suit case is to be rolled along the ground, the hand grip 36 will be placed on the handling strip 33 along the top near the front corner as shown in Fig. 1.

When the suit case is to be slid up or down a flight of stairs the hand grip 36 will be located on the handling strap 33 near the top corner along the end wall as illustrated in Fig. 15.

When it is necessary to carry the suit case by hand the strap 33 is drawn up snug about the suit case by means of the buckles 34 and 35 and the hand grip 36 is attached to the strap at the center of the top wall. The full gravity load is thus supported by the strap in tension and the pull is spread out over the end walls instead of being concentrated at two points on the top wall as is the case when conventional fixed handles are used, and to the detriment thereof, particularly when the suit case is heavily loaded. Two hand grips 36, 36, may be utilized in those cases where two operators are required to manoeuvre or to carry a heavily loaded suit case, in which event, it will be found convenient to clamp a hand grip 36 on the handling strap 33 at each end of the suit case, adjusting the handling strap at the buckles 34 and 35 to permit the hand grips to rest comfortably in the hands of the operators and at a suitable angle and height, as shown in Fig. 16.

In the embodiments of the invention shown in Figures 9, 10, 11, 12, 13 and 14, the carrier and the suit case are separate units adapted to be attached to and detached from each other as distinguished from the built-in carrier structure shown and described in the previous figures of drawings and the description thereof. The overall dimensions of the carrier will be modified to conform to the standard sizes of existing suit cases. In the carriage frame 1, 1, 2, 2, top cross plates, 37, 37, are set into cut away portions at the top thereof, to receive the bottom of the suit case to be transported, suitable notches or grooves 38, 38, being provided to receive the usual metal buttons or cleats, 39, 39, thereon and to permit the said bottom wall to rest flush on the end plates 37, 37, and the tops of the side walls 1, 1. The bottom wall 7 of the carriage frame is secured to the side walls 1, 1, through angle pieces of metal 40, 40, 40, by bolts and screws 41 and 42, respectively.

In these figures, the end of platform 15 is pivotally attached by two loose fitting clamp members 43, 43, to the supporting rod or pipe 18, spaced apart along said rod or pipe and adjacent to the side edges of said platform, pipe sleeve spacers 44, 44, being provided on the pipe or rod 18 between the side edges of the platform 15 and the side walls 1, 1, and two springs 23, 23, are also provided to aid in retracting the platform 15 and to hold it in the retracted position when the bar 20 is moved to the retracted position in the latch plate 22.

The front wheels in this embodiment of the invention are rubber-tired, caster wheels 45, 45, free to rotate about a vertical axis and mounted on the underside of the platform 15, being lowered and raised into and out of contact with the pavement 9 by the lowering and raising of the bar 20, as hereinbefore described, suitable circular openings 46, 46, being provided in the wall 7 to permit the free passage of the wheels therethrough, the diameter of the openings being slightly larger than the paths of travel of the wheels 45, 45, about their respective vertical axes.

In Figures 13 and 14, the carrier of the detachable type is provided with caster wheels 47, 47, in front, as in Figure 9, which are free to rotate about their respective vertical axes on ball bearings. The rear wheels 49, 49, are mounted in fixed position on the underside of the platform 15 to roll forward or backward and do not rotate about their vertical axes. The platforms 15, 15, in this embodiment extend substantially from side wall to side wall and are separated therefrom by the washers 50, 50.

In the detachable embodiments of Figures 9 to 14 inclusive, it may be found advisable, particularly with heavy loads, to provide the carrier frame with corner guards of metal angle pieces, shown at 51, 51, 51, 51, the lower half of each of which is secured to the side and end walls 1, 1, and 2, 2, by four screws 52, 52, 52, 52, as shown at the right in Figure 13, where the two screws fastening one side of the guard to the side 1 is shown, it being understood that the other side of the guard is fastened by two similar screws to the end wall 2. The guards serve to hold the suit case or sample case in place and thereby aid in the transmission to the carrier of the longitudinal and transverse movements of the handle 36 by the operator.

The luggage carrier is provided with a novel system of holding and handling straps of leather, webbing, or the like, which are passed longitudinally through openings 28, 28, in the end walls 2, 2, and thence along the bottom and up along the sides of the walls 4, 4, and thence along the other throughout their length on the suit case as shown in Figs. 1 and 3. The inner holding strap 29, which holds the detachable carrier and suit case together, is in three sections which are joined together by conventional friction buckles 30, 31 and 32, so arranged that the buckles 30 and 32 shall be at the respective top edges of the end walls 4, 4, when the holding strap is drawn snug about the suit case at the buckle 31. The outer handling strap 33 is in two sections which are also spliced together by conventional friction buckles 34 and 35, the upper section passing through the top hole of each of the corner buckles 30 and 32. Lateral movements of the handling strap 33 are transferred through the corner buckle 32 to the holding strap 29, thence by friction to the suit case and the front carrier wheels. The forward pull on the handling strap is carried in tension to the rear end of the suit case and carrier.

In operating the luggage carrier, the operator adjusts the height of the hand grip 36 at the buckle 35, to permit him to grasp it readily in his hand in his normal walking position as he stands at the side of the carrier and near the front end thereof. With the front and rear wheels down and in contact with the pavement, the operator takes hold of the grip 36 and as he moves forward he draws the carrier along with him, guiding the front end (with the pivoted wheels) to the right or left as he travels by moving the hand grip 36 to the right or left of center. Should a flight of stairs be encountered in the path of travel, the operator stops at the foot thereof, moves the bar 20 at each end of the carrier to the up position in the latch plate 22, which action causes the retraction of the wheels 13 and, in turn, causes the carrier to rest on the pavement on the side runners 10, 10. The operator then removes the hand grip 36 from the position shown in Figure 1 to that shown at the right in Figure 15, pulls up the front end of the carrier to place the side runners 10, 10, in contact with the nosing of the stairs and proceeds to pull on the handle 36 as he travels up the stairs, causing the carrier to slide on its runners on the nosing of the successive stair treads until the top step is reached, whereupon the carriage is slid along the pavement the length of the carriage and the end bars 20, 20, are lowered in the latch plate 22, causing the front and rear wheels 13, 13 to come in contact again with the pavement 9 and raising the carrier frame and the slide runners 10, 10, out of contact with the pavement. The hand grip 36 is then put back on the strap 33 in the position shown in Figure 1 and the operator proceeds to travel in the desired direction, as described above.

In going down stairs, the wheels 13 are again retracted, the carrier frame on its runners 10, 10, is tilted to bring the runners into contact with the tread nosings and the operator guides the carrier as it slides down the stairs by grasping the strap 33 by the hand grip 36, or he may grasp the section of strap 33 between the buckles 30 and 34 and guide it from the rear. When the carrier has been slid at its normal position on the level floor or pavement, the wheels are again lowered and the operator takes hold of the strap handle 33 and proceeds as before. In most cases it will not be absolutely necessary to retract the wheels in going up or down stairs for two reasons. First, the end which is held by the operator will usually be lifted off the stair nosing. In the second place, the projection of the unretracted wheels below the side runners is so small that it will offer but slight additional resistance to the sliding motion.

It is understood that any combination of wheel types may be used with either the built-in or detachable carrier.

While I have shown preferred embodiments of my invention, it is to be understood that changes in the size, shape, and arrangement of parts may be made without departing from the spirit of the invention or the scope of the appended claims.

What I desire to claim as new and secure by Letters Patent of the United States, is:

1. A luggage carrier comprising a carrier frame for supporting a piece of luggage, a platform carrying a pair of wheels adapted to be lowered or raised into and out of contact with the pavement, and at each end of said carrier frame, the inner end of each of said platforms being transversely pivoted in the sides of said frame, the outer end of each of said platforms being provided with a raising and lowering bar extending through an aperture in the end wall of said frame and engaging with a notched plate mounted at said aperture for holding said bar in the raised and lowered position, and springs mounted in said frame and connected to said platforms for holding the said bars in the lowered position under tension and retracting and holding under tension the said bars when they are moved to the raised position.

2. A luggage carrier comprising a carrier frame for supporting a piece of luggage, a platform carrying a pair of wheels adapted to be lowered or raised into and out of contact with the pavement, and at each end of said carrier frame, the inner end of each of said platforms being transversely pivoted in the sides of said frame, the outer end of each of said platforms being provided with a raising and lowering bar extending through an aperture in the end wall of said frame and engaging with a notched plate mounted at said aperture for holding said bar in the raised and lowered position, and springs mounted in said frame and connected to said platforms for holding the said bars in the lowered position under tension and retracting and holding under tension the said bars when they are moved to the raised position, one of said pairs of wheels being vertically pivoted on its platform to permit of circuitous movement thereof.

3. A luggage carrier comprising a carrier frame for supporting a piece of luggage, a platform carrying a pair of wheels adapted to be lowered or raised into and out of contact with the pavement, and at each end of said carrier frame, the inner end of each of said platforms being transversely pivoted in the sides of said frame, the outer end of each of said platforms being provided with a raising and lowering bar extending through an aperture in the end wall of said frame and engaging with a notched plate mounted at said aperture for holding said bar in the raised and lowered position, and springs mounted in said frame and connected to said platforms for holding the said bars in the lowered position under tension and retracting and holding under tension the said bars when they are moved to the raised position and overlaying straps secured to the frame and passing over the luggage, one of said straps being adapted to be drawn up snug over the luggage and securing frame and luggage securely together, and the other of said straps serving as a handling strap for the carrier and luggage, buckles held by said one strap and receiving said other strap whereby said other strap is held from lateral movement.

4. A luggage carrier comprising a carrier frame for supporting a piece of luggage, a platform carrying a pair of wheels adapted to be lowered or raised into and out of contact with the pavement, and at each end of said carrier frame, the inner end of each of said platforms being transversely pivoted in the sides of said frame, the outer end of each of said platforms being provided with a raising and lowering bar extending through an aperture in the end wall of said frame and engaging with a notched plate mounted at said aperture for holding said bar in the raised and lowered position, and springs mounted in said frame and connected to said platforms for holding the said bars in the lowered position under tension and retracting and holding under tension the said bars when they are moved to the raised position, one of said pairs of wheels being vertically pivoted on its platform to permit of circuitous movement thereof and overlaying straps secured to the frame and passing over the luggage, one of said straps being drawn up snug over the luggage and securing frame and luggage securely together, and the other of said straps serving as a handling strap for the carrier and luggage, buckles held by said one strap and receiving said other strap whereby said other strap is held from lateral movement.

5. A luggage carrier comprising a carrier frame for supporting a piece of luggage, a platform carrying a pair of wheels adapted to be lowered or raised into and out of contact with the pavement, and at each end of said carrier frame, the inner end of each of said platforms being transversely pivoted in the sides of said frame, the outer end of each of said platforms being provided with a raising and lowering bar extending through an aperture in the end wall of said frame and engaging with a notched plate mounted on said aperture for holding said bar in the raised and lowered position, and springs mounted in said frame and connected to said platform for holding the said bars in the lowered position under tension and retracting and holding under tension the said bars when they are moved to the raised position and slide runners mounted on the bottom edges of the sides of said frame and along the length thereof, and overlaying straps secured to the frame and passing over the luggage, one of said straps being drawn up snug over the luggage and securing frame and luggage securely together, and the other of said straps serving as a handling strap for the carrier and luggage, buckles held by said one strap and receiving said other strap whereby said other strap is held from lateral movement.

6. A luggage carrier comprising a carrier frame for supporting a piece of luggage, a platform carrying a pair of wheels adapted to be lowered or raised into and out of contact with the pavement, and at each end of said carrier frame, the inner end of each of said platforms being transversely pivoted in the sides of said frame, the outer end of each of said platforms being provided with a raising and lowering bar extending through an aperture in the end wall of said frame and engaging with a notched plate mounted at said aperture for holding said bar in the raised and lowered position, and springs mounted in said frame and connected to said platforms for holding the said bars in the lowered position under tension and retracting and holding under tension the said bars when they are moved to the raised position, one of said pairs of wheels being vertically pivoted on its platform to permit of circuitous movement thereof, and slide runners mounted on the bottom edges of the sides of said frame and along the length thereof, and overlaying straps secured to the frame and passing over the luggage, one of said straps being drawn up snug over the luggage and securing frame and luggage securely together, and the other of said straps serving as a handling strap for the carrier and luggage, buckles held by said one strap and receiving said other strap whereby said other strap is held from lateral movement.

GERALD G. KUBO.

REFERENCES CITED

The following references are of record in the file of this patent:

UNITED STATES PATENTS

| Number | Name | Date |
|---|---|---|
| 234,496 | Simmons | Nov. 16, 1880 |
| 905,759 | Strauss | Dec. 1, 1908 |
| 1,050,352 | Deutschman | Jan. 14, 1913 |
| 1,084,930 | Eckelberg | Jan. 20, 1914 |
| 1,197,190 | Dunn et al. | Sept. 5, 1916 |
| 1,611,456 | Keeler | Dec. 21, 1926 |
| 1,715,865 | Rosenfeld | June 4, 1929 |
| 1,808,864 | Pinheiro | June 9, 1931 |
| 1,847,501 | Stahler | Mar. 1, 1932 |
| 1,854,156 | Germond, Jr. | Apr. 12, 1932 |
| 2,243,892 | Bedford et al. | June 3, 1941 |
| 2,334,364 | Vavrik et al. | Nov. 16, 1943 |